ELECTROSTATICALLY DIGITIZED TAPE DISPLAY MEANS

Filed Oct. 27, 1964 Sheet 1 of 2

INVENTOR.
ALFRED L. LEVINE
BY Herbert L. Davis
ATTORNEY

INVENTOR.
ALFRED L. LEVINE
BY [signature]
ATTORNEY

United States Patent Office 3,440,642
Patented Apr. 22, 1969

3,440,642
ELECTROSTATICALLY DIGITIZED TAPE DISPLAY MEANS

Alfred L. Levine, Waldwick, N.J., assignor to The Bendix Corporation, Teterboro, N.J., a corporation of Delaware Filed Oct. 27, 1964, Ser. No. 406,680
Int. Cl. H04l 3/00; G06k 7/08, 19/06
U.S. Cl. 340—347 4 Claims

ABSTRACT OF THE DISCLOSURE

An electrically digitized tape display means including an elongated tape with a functional scale and a plurality of metallic channels disposed laterally and longitudinally according to the functional scale. A sensing device including a plurality of electrically energized capacitive means is arranged for relative longitudinal motion with the tape for providing digital signals corresponding to the functional scale.

This invention relates to a means of providing an electrostatically digitized tape display device and more particularly to a novel means of eliminating a mechanical linkage between the display system and a feedback device.

Heretofore, display systems have required a movable tape or marker readable against a reference line, or a scale displaying the appropriate functional data. In order to utilize these data as part of a control or command system, a gear means or other mechanical linkage has been necessary to interconnect the aforementioned display items with feedback means such as potentiometers, synchros, digital encoders, and the like.

Such mechanical interconnections have certain inherent disadvantages. In means of this type, inaccuracies may result from inefficiences such as friction losses or slippage in a gear system. Moreover, such an interconnection between the tape display and the feedback device may be bulky and require excessive space within the instrumentation means. Such a cosideration must be given prime concern, particularly in aircraft and space applications.

An object of the present invention is to provide a novel means of avoiding the aforenoted short comings in previous tape display means.

Another object of the present invention is to provide a novel means of interconnecting the tape display device and a feedback system.

Another object of this invention is to provide a novel means of evolving coded digital data which may be used as feedback information.

These and other objects and features of the invention are pointed out in the following description in terms of the embodiments thereof which are shown in the accompanying drawings. It is to be understood, however, that the drawing are for the purpose of illustration only and are not a definition of the limits of the invention, reference being had to the appended claims for this purpose.

Figure 1:
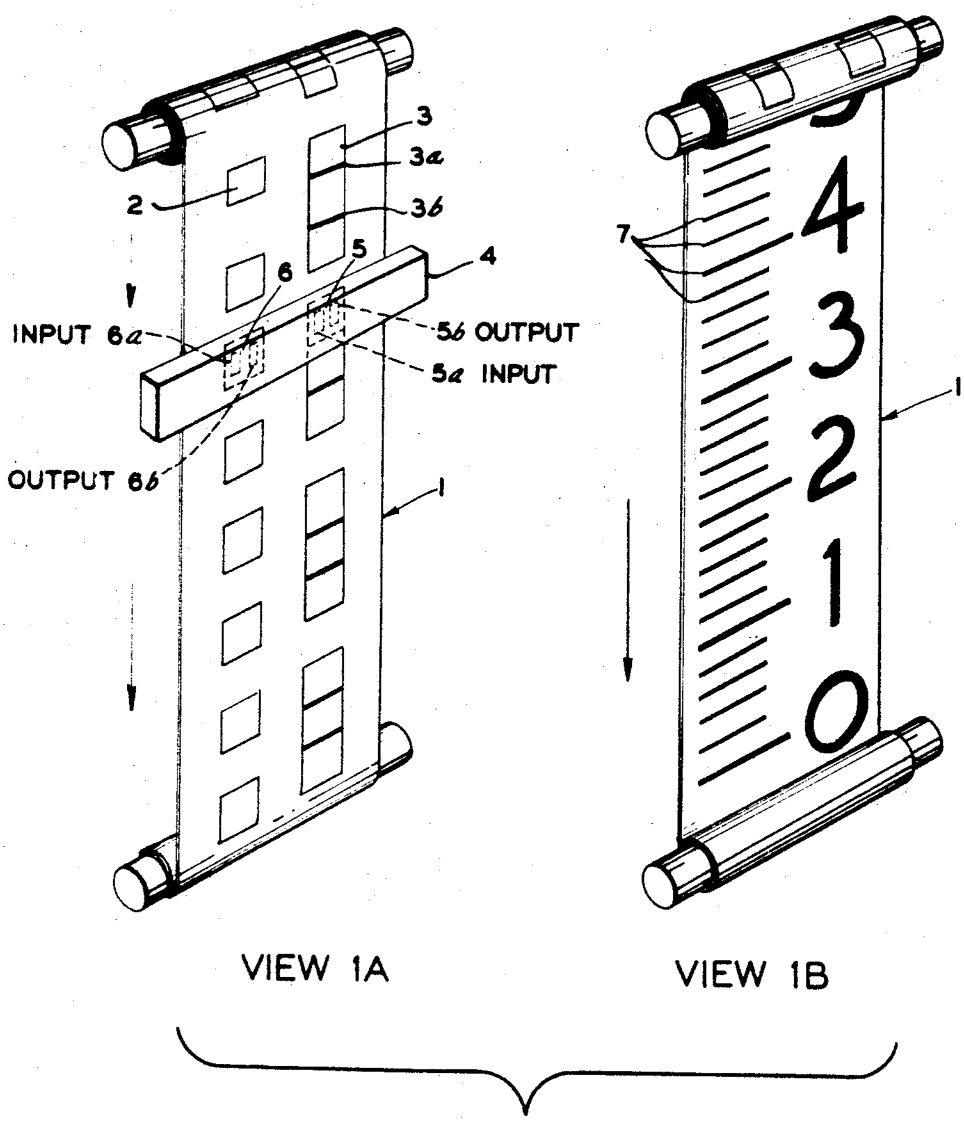
FIGURE 1 is a perspective diagrammatic drawing showing the novel means of providing an electrostatically digitized tape display system.

Referring now to the drawing of FIGURE 1, numeral 1 is a display tape of suitable material with a graduated functional scale 7 on one side (view 1B) and a plurality of thin metallic channels on the other side, shown herein for purposes of example as being two in number and generally indicated by numerals 2 and 3 in the FIGURE (view 1A). In order to protect against wear and to prevent shorting of the channels 2 and 3 to a reader head 4, these channels may be covered with a thin film of a nonconductive material such as nylon. The length and the number of these channels is a function of the display scale factor, range and the desired resolution required of the display. The digital code so formed therefore bears a direct relation to the scale 7 embodied on the other side of the tape 1. As an example, a display means may be constructed having a resolution of .010 inch and 15 channels in order to display an altitude parameter of zero to 80,000 feet, with a scale of 1,000 feet per inch of tape displayed and a resolution of 10 feet.

The reader head 4 comprises a plurality of capacitors shown herein for purposes of example as being two in number and generally designated by numerals 5 and 6, each having opposite plates *5a* and *5b*, and *6a* and *6b*. One such capacitor is provided for each channel embodied in the tape 1. When an alternating current input is applied to the plates *5a* and *6a* of the capacitors 5 and 6 the respective outputs received from plates *5b* and *6b* of capacitors 5 and 6 will vary as the capacitive reactance varies due to the proxmity of a metallic channel to these plates. In FIGURE 1, as the capacitors 5 and 6 are adjacent respectively to the channels 3 and 2, an increase in capacitative reactance occurs due to a change in dielectric characteristics. As the proximity of the metallic channels 3 and 2 to the capacitors 5 and 6 varies due to the longitudinal movement of the tape 1 relative to the reader head 4 as indicated by the arrows, the voltage output detected at the plates *5b* and *6b* will vary according to the following relationships:

$$(1)\ X_C = \frac{1}{2}\pi fc$$

$$(2)\ E = IX_C$$

where:

$X_C$=Capacitive reactance
$f$=Frequency
C=Capacitance
E=Voltage
I=Current

Figure 2:
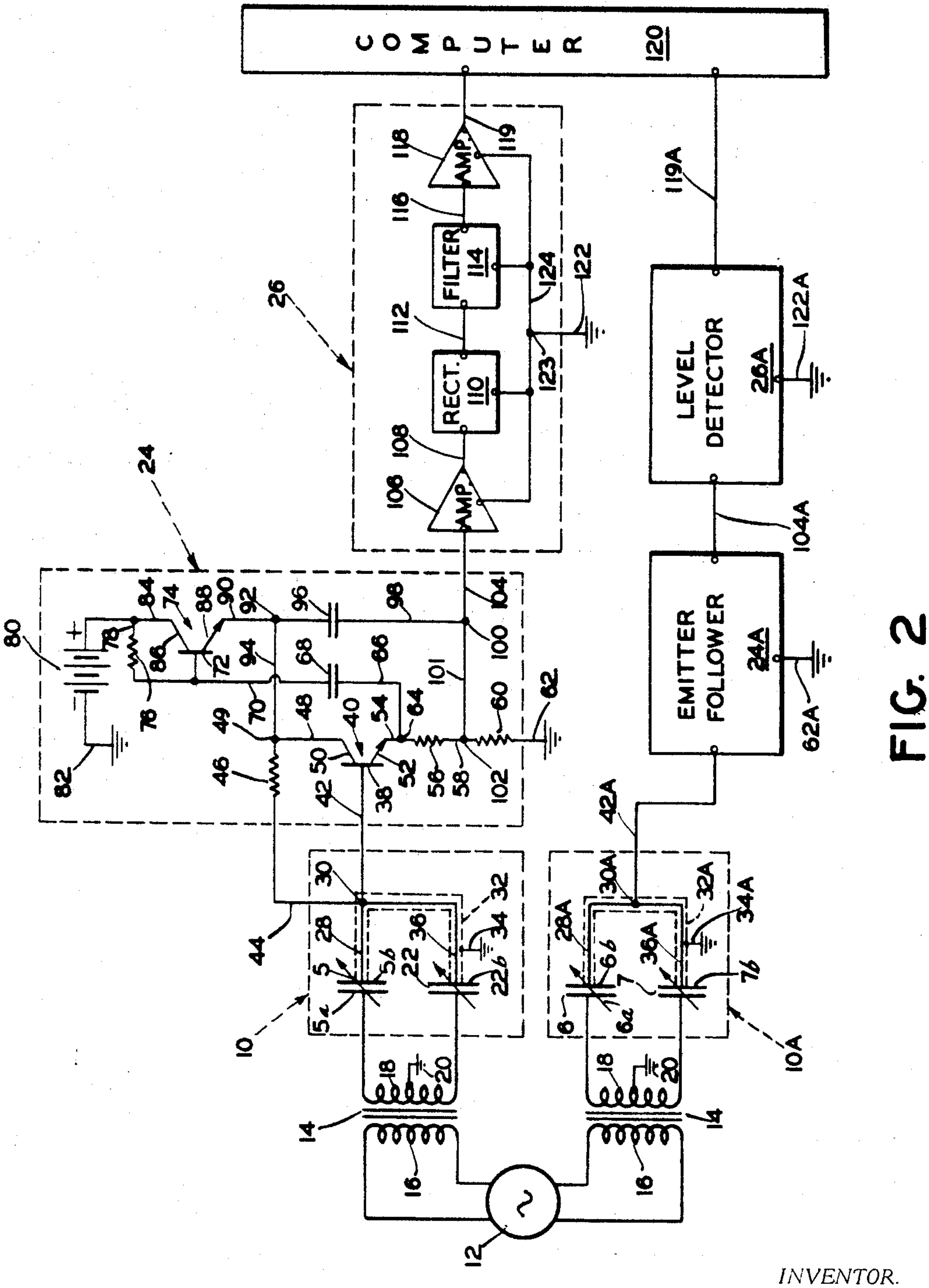
FIGURE 2 is a schematic wiring diagram showing typical electrical interconnections embodied in the invention.

This voltage variation may then be applied to various feedback devices including a digital encoder by means as shown in FIGURE 2.

Of importance to the proper operation of the means described herein is the consideration that the greater the length of the channels 2 and 3 the greater will be the effective area of the electrostatic system. In order to prevent a loss of signal due to this long metallic area coupling with electrical ground, the more lengthy channels are made electrically discontinuous. This is accomplished by providing small separations along the length of the channel not in excess of ten percent of the width of the reader head 4 as shown by the numerals *3a* and *3b* in FIGURE 1.

Referring now to FIGURE 2, a readout circuit is indicated generally by numeral 10. This circuit comprises an alternating current input supply 12 coupled to a transformer 14 to accomplish a phase angle variation. A primary winding 16 of the transformer 14 is connected across the power supply 12 and inductively coupled to a secondary winding 18 having a center tap ground connection 20, one leg of the secondary winding 18 is connected to readout capacitor 5 while the other leg is connected to an adjustable capacitor 22. The readout capacitor 5 is provided with opposite plates *5a* and *5b* to sense the change in dielectric characteristics as depicted in FIGURE 1 and indicated in the description thereof. An adjustable capacitor 22 may be so provided and adjusted as to reduce the residual signal and lower the noise ratio which have otherwise been in degradation of the desired voltage signal.

The change in dielectric characteristics so detected from the readout capacitor 5 may then be applied as a voltage signal to a feedback device which, for purposes of example, is here shown as including an emitter follower means designated by numeral 24 and a level detector means designated generally by numeral 26. The emitter follower means 24 is arranged so as to match the impedance of the readout circuit 10 with the impedance of the level detector 26.

An output detected from an output plate 5*b* of a capacitor 5 coupled through a conductor 28 is joined at a point 30 with the output from an output plate 22*b* of a capacitor 22 coupled through a conductor 36. Outputs coupled through the conductor 28 and the conductor 36 are shielded by a shield 32 with the shield 32 connected to a grounded conductor 34.

The combined output at point 30 is connected to a base 38 of an NPN type transistor 40 through a conductor 42. The combined output at the point 30 is further connected through a conductor 44 to a resistor 46 and through a conductor 48 to a collector 50 of the transistor 40. The transistor 40 has an emitter 52 connected by a conductor 54, a resistor 56, a conductor 58, and a resistor 60 to a grounded conductor 62.

The output from the emitter 52 of the transistor 40 at the conductor 54 is connected at a point 64 through a conductor 66 coupling capacitor 68 and a conductor 70 to a base 72 of an NPN type transistor 74. The conductor 70 is connected through a resistor 76 and a conductor 78 to a positive terminal of a battery 80 having a negative terminal connected to a grounded conductor 82 while the conductor 78 is further connected through a conductor 84 to a collector 86 of the transistor 74. The transistor 74 has an emitter 88. The output from the emitter 88 of the transistor 74 is applied through a conductor 90 which is joined at a point 92 by a conductor 94 joined to the conductor 48 at a point 49.

The output from the emitter 88 of the transistor 74 is further applied at the point 92 through a coupling capacitor 96 and a conductor 98 to a point 100 on a conductor 101 joined to the conductor 58 at a point 102. An output conductor 104 leads from the point 100 to the input of an amplifier 106 of the level detector 26.

The output signal received from the emitter follower 24 through the conductor 104 is coupled with the level detector 26 and applied therefrom through an amplifier 106, a conductor 108, a rectifier 110, a conductor 112, a filter 114, a conductor 116, an amplifier 118, and a conductor 119 to a utilizing means shown generally in FIGURE 2 as a computer 120. The level detector 26 is further connected to a grounded conductor 122 which is connected at point 123 to a conductor 124 leading from commonly grounded input and output terminals of the amplifier 106, rectifier 110, filter 114, and amplifier 118.

The readout circuit designated generally by numeral 10A includes a readout capacitor 6 with plates 6*a* and 6*b* as referred to and described in FIGURE 1. The primary winding 16 of the transformer 14 is connected across the power supply 12 and inductively coupled through the secondary winding 18 of the transformer 14 having the center tap ground connection 20.

One leg of the secondary winding 18 of the transformer 14 is connected to a readout capacitor 6 having an input plate 6*a* and an output plate 6*b*. The other leg of the secondary winding 18 of the transformer 14 is connected to an adjustable capacitor 7 which may be provided and so adjusted as to lower the noise ratio which would otherwise be in degradation of the desired signal.

The output detected from the output plate 6*b* of the capacitor 6 through a conductor 28A is joined at a point 30A with an output from an output plate 7*b* of the capacitor 7 through a conductor 36A. Outputs coupled through the conductor 28A and the conductor 36A are shielded by a shield 32A with the shield 32A being connected to a grounded conductor 34A. The combined output formed by the conductor 28A joining the conductor 32A at a point 30A is connected through conductor 42A to an emitter follower 24A, a conductor 104A, a level detector 26A, and a conductor 119A to a utilizing means shown generally in FIGURE 2 as a computer 120. The emitter follower circuit 24A has an input and an output terminal connected to a grounded conductor 62A while the level detector circuit 26A has an input and an output terminal connected to a grounded conductor 122A. Corresponding parts to those described with reference to the readout circuit 10 have been indicated by corresponding numerals bearing the subscript letter A and which parts operate in a corresponding manner.

For purposes of example, only two such interconnected circuit systems have been indicated and described. In application, a plurality of such circuit systems, coupled in parallel, one circuit for each of the channels, such as the channel 2 and the channel 3, as described in FIGURE 1, is required with the digitally encoded data output from each system being interconnected with a utilizing means designated herein as a computer 120.

Although the novel means described herein has been incorporated in an aircraft instrumentalation display system, it should be understood that it may be used in any system that employs a tape display means and requires that such means be interconnected to a feedback device.

While several embodiments of the invention have been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. An electrostatically digitized tape display means comprising an elongated longitudinally movable tape having a visual functional scale on one side and a plurality of channels arranged laterally and longitudinally according to the functional scale on the other side, at least one of said channels being of greater length than the other of said channels, the longer of said channels being electrically discontinuous to prevent coupling with an electrical ground, and all of the channels being covered with a thin insulating film, a reader head comprising a plurality of signal readout capacitors corresponding to the channels on the tape, a circuit means for affixing an electrical current to said capacitors, a plurality of readout circuits, each of said readout circuits including one of the said readout capacitors, the tape and reader head being mounted in movable relation to each other so that the longitudinal movement of the tape relative to the reader head will cause the channels on the tape to become adjacent to the signal capacitors on the reader head causing a plurality of signal voltage patterns to be produced in each of said readout circuits, a plurality of parallel coupled emitter follower circuits, one of said emitter follower circuits being connected to an output of each of said readout circuits, a plurality of parallel coupled level detection circuits, one of said level detection circuits being connected to an output of each of said emitter follower circuits, each of said emitter follower circuits being provided to match the impedance of the corresponding readout and level detection circuits, and the outputs from said level detection circuits providing coded digital signals and a computer for receiving said signals.

2. The combination defined by claim 1 in which the outputs from said plurality of readout circuits includes means to shield against stray or extraneous signals.

3. In a display system of a type including a longitudinally movable tape having a scale indicating a visual functional parameter on one side thereof and a plurality of channels laterally and longitudinally disposed on the other side, reader head means comprising readout capacitors corresponding to each channel with circuit means for applying an electrical current to each capacitor, the tape and reader head arranged in relation to each other so that the longitudinal movement of the tape causes the channels thereon to become adjacent to the capacitors on the reader head causing a plurality of signal voltage patterns to be produced, a plurality of parallel coupled readout circuits to sense said signal voltage patterns, each of said circuits including one of said readout capacitors, a plurality of parallel coupled electronic control circuits, one of said electronic control circuits being connected to an output of each of said readout circuits, a plurality of parallel coupled electronic detection circuits, one of said electronic detection circuits being connected to an output of each of said electronic control circuits, each said electronic control circuit being provided to match the impedance of the corresponding readout and electronic detection circuits, and the outputs from said electronic detection circuits providing digitally encoded signals.

4. An electrostatically digitized tape display means comprising a longitudinally movable tape having a visual functional scale on one side thereof and a plurality of longitudinally and laterally disposed channels on the other side, the longitudinal and lateral disposition of said channel being controlled by the functional scale, the longer of said channels being made electrically discontinuous to prevent a coupling with an electrical ground, a reader head comprising a plurality of capacitors corresponding to the channels on the tape, circuit means for applying an electrical current to said capacitors, means for providing a voltage pattern in response to the relative motion of the longitudinally movable tape to the capacitors on the reader head, and means to electrically interconnect said voltage pattern means to an impedance matching means and a detection means.

References Cited

UNITED STATES PATENTS

| | | | |
|---|---|---|---|
| 1,549,475 | 8/1925 | Finch ___________ | 235—61.116 |
| 1,855,569 | 4/1932 | Chireix __________ | 235—61.116 |
| 2,294,681 | 9/1942 | Moon ___________ | 235—61.116 |
| 2,416,625 | 2/1947 | Hooper _________ | 235—61.116 |
| 2,546,694 | 7/1951 | Roggenstein ______ | 235—61.116 |
| 3,044,694 | 7/1962 | Davidson et al. ___ | 235—61.116 |

MAYNARD R. WILBUR, *Primary Examiner.*

W. J. KOPACZ, *Assistant Examiner.*

U.S. Cl. X.R.

235—61.12, 61.11